(No Model.)
W. B. McCLURE.
PROCESS OF MANUFACTURING ARTIFICIAL FUEL.
No. 437,163. Patented Sept. 23, 1890.
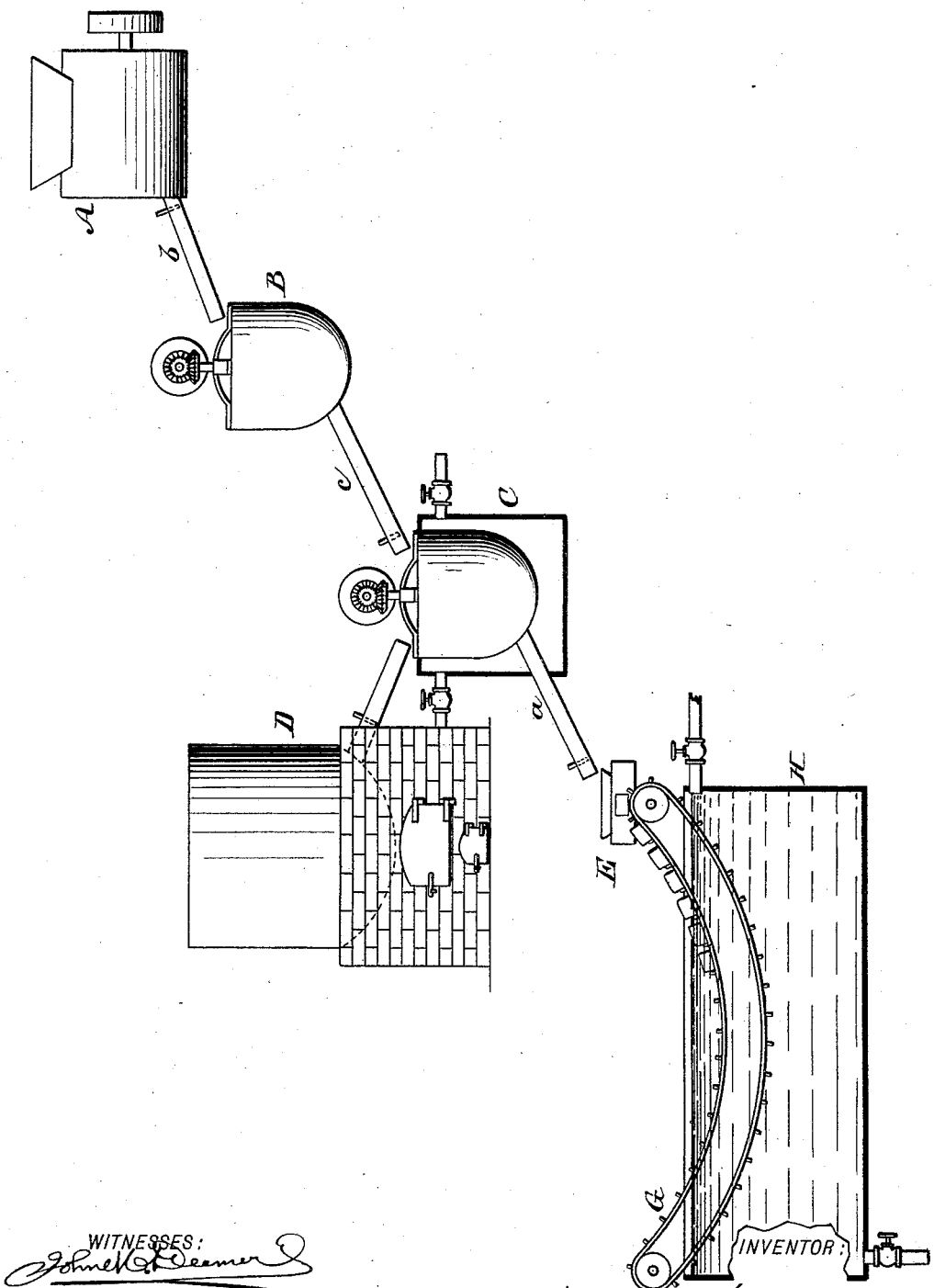
WITNESSES:
INVENTOR:
W. B. McClure
BY Munn & Co.
ATTORNEYS

UNITED STATES PATENT OFFICE.

WILLIAM B. McCLURE, OF ST. PAUL, MINNESOTA.

PROCESS OF MANUFACTURING ARTIFICIAL FUEL.

SPECIFICATION forming part of Letters Patent No. 437,163, dated September 23, 1890.

Application filed March 22, 1890. Serial No. 344,926. (No specimens.)

*To all whom it may concern:*

Be it known that I, WILLIAM B. MCCLURE, of St. Paul, in the county of Ramsey and State of Minnesota, have invented a new and Improved Process of Manufacturing Artificial Fuel, of which the following is a full, clear, and exact description.

This invention consists in a process of manufacturing an artificial fuel composed of certain ingredients, and which composition I make the subject of a separate application for patent simultaneously with this.

The process is made up of certain steps whereby the ingredients constituting the composition are thoroughly incorporated and prepared and the volatile parts of the compound retained in it, substantially as hereinafter described, and pointed out in the claim.

In carrying out my process I do not confine myself to any particular mechanism for accomplishing the same, nor yet to any precise proportions of the ingredients; but the following description will serve to show, by way of illustration, how the process may be carried into effect.

The drawing or diagram annexed is a view in elevation of the means I have selected, according to the following description, to illustrate my process.

I have taken, for instance, one (1) ton of culm or coal-dust and placed it in a grinding-mill A of ordinary or any suitable description, and finely ground or pulverized the same. This fine coal-dust I have then passed, as by a spout *b*, controlled by a suitable gate, into an ordinary mixer B, provided with suitable stirrers, and as the coal-dust leaves the grinding-mill or enters the mixer B, I have fed in or added to each ton of such coal-dust from one hundred to one hundred and fifty pounds (100 to 150 lbs.) or thereabout of sharp, clean sand and about one hundred pounds (100 lbs.) of finely-powdered well-burned lime-dust, and thoroughly mixed the whole together—that is, the coal-dust and lime-dust, both in a dry state, and the sand. When the ingredients of such mass have been evenly mixed, the mass is next passed by any suitable devices—as, for instance, by a spout *c* controlled by gates—into a steam-heated mixer C, where it is met by a supply of fluid asphaltum drawn from a furnace-heated tank D in the proportion of about ten (10) to fifteen (15) per cent. of asphaltum to the whole mass of coal-dust, lime-dust, and sand. The whole is then thoroughly mixed together in the steam-mixer C. The asphaltum used in this mixture may be of any of the solid kinds of asphaltum, which is melted at about 300° Fahrenheit, and which has added to it about ten to fifteen per cent., relatively to the whole mass of solid asphaltum, of liquid asphaltum—such, for instance, as found in Southern California, Cuba, and Venezuela. This liquid asphaltum, applied in about the proportion specified, refines the solid asphaltum by throwing down the abundant earths held in the substance of the solid asphaltum, and the mixture of the two asphaltums combine well with coal-dust for fuel. From the steam-heated mixer C the whole mass of coal-dust, lime-dust, sand, and asphaltum is then passed, as by a conveyer or spout *a*, into a press E of any suitable kind adapted to press the mass into blocks, as other compositions have been formed, and these blocks, instead of being dried in ovens, are then and immediately after leaving the press treated to a cold-water bath to retain the volatile parts of the compound, which is important, and which may be done by passing the blocks as they come from the press onto an endless traveling, sagging, or bellying conveyer G through cold water in a tank H. By thus setting and cooling the blocks ready for handling, not only are the volatile parts retained in the composition, but time, labor, and expense are saved.

The asphaltum serves as a combustible binder of the mass, the burned or calcined lime-dust forming with the asphaltum a hard cement-like substance and preventing breakage of the blocks during transportation; also being nearly free from smoke and making the blocks clean to handle, while the sand in the composition serves to separate the particles of coal-dust, so that when fire reaches each atom of coal-dust the atom goes into flame with little smoke, and by first mixing the sand as well as the lime-dust with the coal-dust before mixing the asphaltum with the mass, it (the said sand) is more evenly distributed among the atoms of coal-dust.

Having thus fully described my invention, I claim as new and desire to secure by Letters Patent—

The within-described process of making artificial fuel composed of coal-dust, sand, pulverized calcined lime-dust, and asphaltums, which consists in first finely pulverizing the coal, then mixing with it, free from moisture, the sand and lime-dust, then mixing the whole mass, subject to heat, with the asphaltum in a fluid state, then pressing the entire mass into blocks, and subsequently subjecting said blocks to immersion in cold water, as set forth.

WILLIAM B. McCLURE.

Witnesses:
A. GREGORY,
EDGAR TATE.